Figure 6:
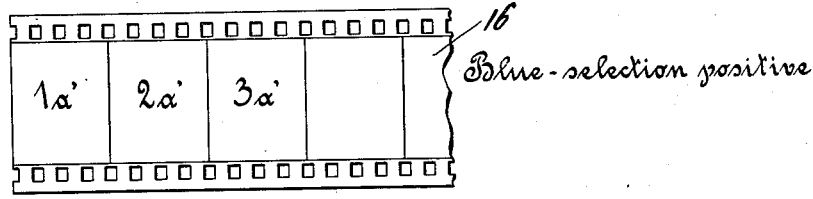

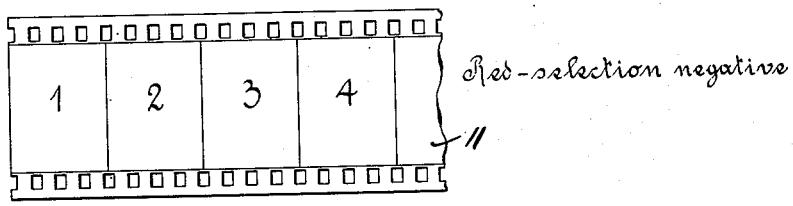
Fig. 1. — Red-selection negative 11
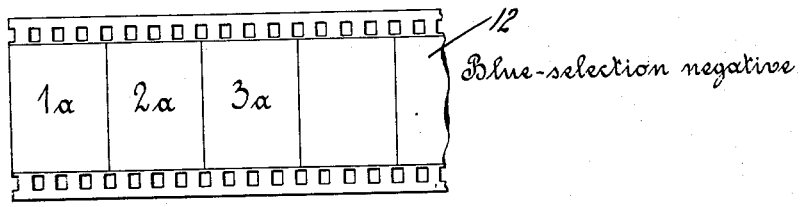
Fig. 2. — Blue-selection negative 12
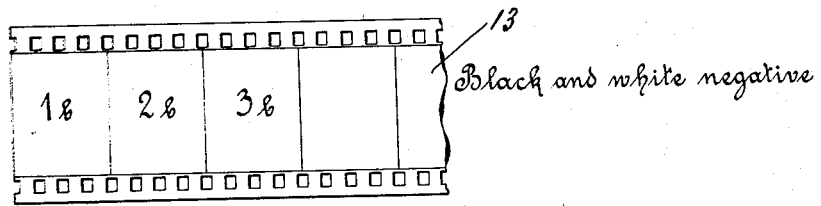
Fig. 3. — Black and white negative 13
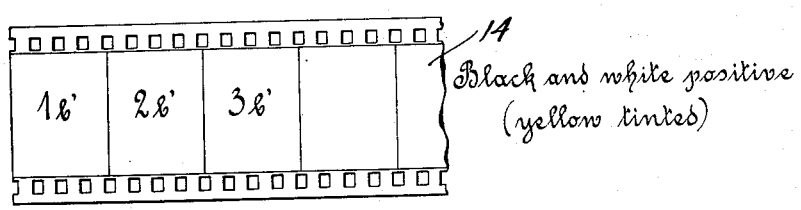
Fig. 4. — Black and white positive (yellow tinted) 14
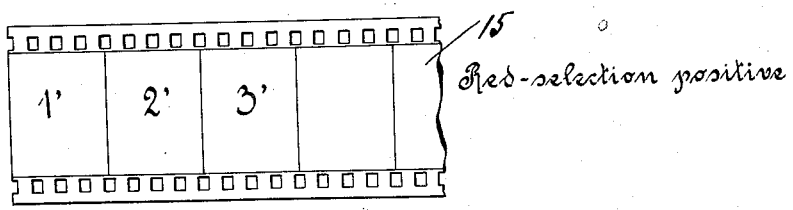
Fig. 5. — Red-selection positive 15

K. WARGA.
METHOD OF PRODUCING COLOR FILMS.
APPLICATION FILED SEPT. 22, 1921.

1,420,673.

Patented June 27, 1922.
2 SHEETS—SHEET 2.

Blue-selection positive

Blue negative printing plate

Red negative printing plate

Multicolor picture

K. Warga Inventor
By his Attorney
Sigmund Herzog

UNITED STATES PATENT OFFICE.

KALMAN WARGA, OF NEW YORK, N. Y., ASSIGNOR TO PYROCOLOR CORPORATION, A CORPORATION OF VIRGINIA.

METHOD OF PRODUCING COLOR FILMS.

1,420,673.   Specification of Letters Patent.   Patented June 27, 1922.

Application filed September 22, 1921. Serial No. 502,352.

*To all whom it may concern:*

Be it known that I, KALMAN WARGA, a citizen of the United States, and resident of the city of New York, in the county of New York and State of New York, have invented certain new and useful Improvements in a Method of Producing Color Films, of which the following is a specification.

The present invention relates to the art of color photography, and more particularly it has reference to that system in color photography in which there are first secured a plurality of color-selection negatives by simultaneous exposure from substantially the same view point, from which negatives a plurality of positives are secured and combined, so as to reproduce fully or approximately the natural colors of the original subject. Within the scope of this improvement there is intended to be included the subject of motion pictures, when the same are so taken and exposed as to reproduce the original colors of the subject, since the representation of motion pictures in color consists of a series of representations, each of which may be considered as composed of a plurality of color positives suitably combined for the observer.

As far as known, heretofore color photographs or color motion picture films were produced photographically from suitable color-selection negatives. For this purpose the film must be sensitized a number of times, corresponding to the number of color-selection negatives used in producing the pictures. This method of producing multi-color photographs is very expensive, requires great skill, takes considerable time, yet it does not give satisfactory results, mainly for the reason that the positive film is apt to shrink, etc., as it is being developed after each photographic printing, so that the monochrome components of the positive image do not register exactly thereon.

The present invention has for its main object to overcome these defects, that is to say to provide a method whereby exact registration of the component images is secured, and whereby the photographs can be produced with ordinary skill, at comparatively low cost and in considerably less time than the multi-color photographs heretofore made.

Other objects of the invention will appear in the hereinafter following specification.

Figure 7:
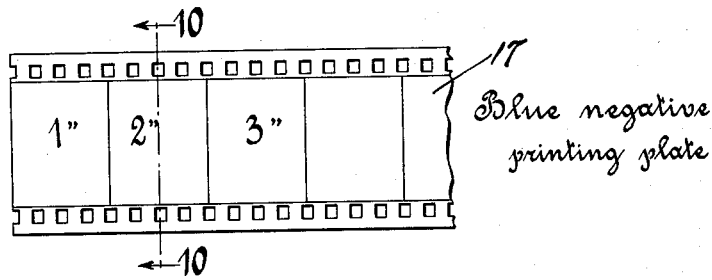
Figure 8:
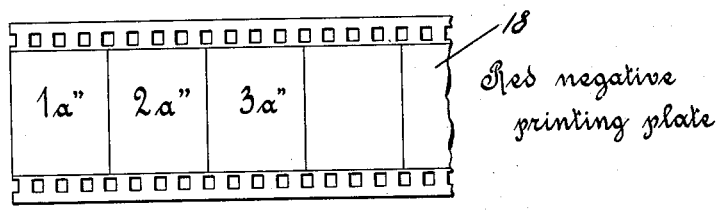
Figure 9:
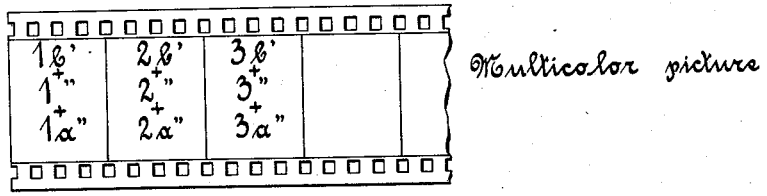
Figure 10:

In the drawings, Fig. 1 is a diagrammatic plan view of a strip of a color-selection negative taken through a color filter on a two-color basis; Fig. 2 is a similar view of a color-selection negative taken through the complementary color filter; Fig. 3 is a similar view of a strip of negative band of the ordinary black and white type; Fig. 4 is a similar view of a strip of an ordinary black and white positive printed from the negative band shown in Fig. 3; Fig. 5 is a diagrammatic plan view of a strip of positive film printed from the negative band shown in Fig. 1; Fig. 6 is a similar view of a portion of a positive band printed from the negative band shown in Fig. 2; Fig. 7 is a diagrammatic plan view of a negative printing plate produced from the positive film band shown in Fig. 5; Fig. 8 is a similar view of a portion of a negative printing plate produced from the positive band shown in Fig. 6; Fig. 9 is a diagrammatic plan view of a positive film band illustrating the combination of the bands shown in Figs. 4, 7 and 8; and Fig. 10 is a section taken on line 10—10 of Fig. 7.

In practicing the invention, three simultaneously exposed views or series of views, that is to say negatives, are taken from substantially a single viewpoint for the purpose of securing color-selection negatives, from which afterwards the combination positive is to be made. In exposing for the view or series of views constituting the subject, there may be a red screen interposed in the path of the light rays or in some other way a selection of red rays made, and in connection therewith a film sensitized for red rays may be employed. Thus a red-selection negative 11 is obtained (Fig. 1). Similarly a blue screen and a blue sensitized film may be employed for securing a blue-selection negative 12 (Fig. 2). The third negative, denoted by the numeral 13 (Fig. 3), is of the ordinary black and white type. The sensitive strip which is used for making this third negative should be coated with an orthochromatic emulsion. Cameras have been heretofore constructed for simultaneously making three exposures of the type mentioned, so that a further description thereof seems to be unnecessary herein.

From the black and white negative 13 an ordinary black and white positive 14 (Fig. 4) is secured, for instance, by ordinary photographic printing process. The positive is then dyed or coated yellow by drawing it, for instance, through a suitable transparent color bath. From the red-selection negative 11 a red-selection positive 15 (Fig. 5) and from the blue-selection negative 12 a blue-selection positive 16 (Fig. 6) is made, and from these last-mentioned two positives printing plates are procured. More particularly from the red-selection positive 15 a blue negative printing plate 17 (Fig. 7) and from the blue-selection positive 16 a red negative printing plate 18 (Fig. 8) is made, from which impressions are made with blue and red colors, respectively, upon the yellow tinted black and white positive 14.

In producing these printing plates strips 19, preferably, of thin aluminum are used, in case motion picture films are to be made. These strips, after having been perforated in the manner as films are perforated, are coated on one of their faces with gelatine 20, which has been first sensitized with potassium bichromate, so as to prepare it for exposure under the selection positives above referred to. One of these strips is exposed to the red-selection positive 15, and the other strip to the blue-selection positive 16, they being thereafter immersed in water for removing the free potassium bichromate from the gelatine. After washing out the unaffected potassium bichromate and drying the said strips, the gelatine coating is treated with a quick drying oil color or ink, which adheres only to those portions of the gelatine from which the potassium bichromate has not been removed. After the oil color or ink has become thoroughly dry, a negative printing plate is obtained having water repelling portions, constituted by those areas which are covered by the oil color or ink, and water color absorbing portions, constituted by those areas from which the potassium bichromate has been washed out.

From these printing plates impressions may be made on yellow tinted black and white positive 14 above referred to. From the red negative printing plate 18 a red impression is made and from the blue negative printing plate 17 a blue impression is made by using transparent anilin colors dissolved in water and alcohol, the impressions being made on the sensitized face of the yellow tinted black and white positive 14, more particularly on a printing press, that is provided with suitable feeding means, engaging the yellow tinted black and white positive 14 and the respective printing plate. Obviously, the two impressions are made one after the other, whereby the blue and red images are combined with the yellow tinted black and white pictures, (Fig. 9), thereby producing a multi-color picture. The pictures constitute a series of transparencies in the motion picture film and are ready to be passed through the projecting apparatus.

It is obvious that with a single printing plate as many impressions may be made as desired, the printing plates being preserved, together with the black and white negative, for future use by winding them upon reels in the same manner as kinematographic negatives are wound up.

From the foregoing it appears that the method herein described is very simple, the photographs being adapted to be produced with ordinary skill at comparatively low cost and in considerably less time than the multi-color photographs heretofore made. Absolute registry of the three pictures is obtained, as the printing plates are produced from original negatives just the same as the black and white positive film is procured.

The pictures, when projected on a screen, appear to be even throughout for the reason that water colors are used in printing the same. It has been heretofore the custom to use oil colors or inks, but their application was unsuccessful, as the pictures appear "spotted" when projected onto the screen.

It is obvious that, while herein the black and white positive has been described as being printed photographically, the same may be made by mechanical printing from a printing plate of the same character as the red and blue plates. In the claims hereto appended, therefore, the term "black and white positive" is intended to cover a picture made either by photographic printing or by mechanical printing.

What I claim is:—

1. The method of producing a color photograph or color motion picture film from a black and white negative and from suitable color-selection negatives, which consists in, first, making a black and white positive from said black and white negative, second, making photomechanical printing plates from said color-selection negatives, and, third, printing mechanically from each of said plates on said black and white positive in register with the black and white picture in an aqueous color complementary to the color of the screen used in taking the corresponding color-selection negative.

2. The method of producing a color photograph or color motion picture film from a black and white negative and from suitable color-selection negatives, which consists in, first, making a black and white positive from said black and white negative, second, tinting said positive, third, making photomechanical printing plates from said color-selection negatives, and fourth, printing mechanically from each of said plates on said black and white positive in register with the black and white picture in an aqueous color complementary to the color of the screen used in taking the corresponding color-selection negative.

3. The method of producing a color photograph or color motion picture film from a black and white negative and from a set of color-selection negatives which represent the respective colors red and blue, which consists in, first, making a black and white positive from said black and white negative, second, tinting said positive yellow, third, making photomechanical printing plates from said color-selection negatives, fourth, printing on said positive mechanically from the plate obtained from the red-representing negative a monochrome positive of blue aqueous color, and fifth, printing on the black and white positive mechanically from the plate obtained from the blue-representing negative a monochrome positive of red aqueous color in registry with the black and white and blue images.

Signed at New York, in the county of New York and State of New York, this 14th day of July, A. D. 1921.

KALMAN WARGA.